United States Patent [19]
Alonso

[11] Patent Number: 5,604,316
[45] Date of Patent: Feb. 18, 1997

[54] MULTIPLE PHASE CORIOLIS MASS METER

[76] Inventor: Joey G. Alonso, 3400 Princeton Way, Anchorage, Ak. 99508

[21] Appl. No.: 325,613

[22] Filed: Oct. 19, 1994

[51] Int. Cl.$^6$ ....................................................... G01F 1/82
[52] U.S. Cl. ..................... 73/861.352; 73/861.04
[58] Field of Search ............................... 73/200, 861.37, 73/861.04, 861.38

[56] References Cited

U.S. PATENT DOCUMENTS

| | | | |
|---|---|---|---|
| 2,813,423 | 11/1957 | Attfillisch et al. | 73/861.38 |
| 2,877,649 | 3/1959 | Powers | 73/861.38 |
| 3,087,325 | 4/1963 | Roth | 73/861.38 |
| 4,934,195 | 6/1990 | Hussain | 73/861.38 |
| 5,287,754 | 2/1994 | Kazakis | 73/861.38 |
| 5,301,557 | 4/1994 | Cage et al. | 73/861.38 |
| 5,359,900 | 11/1994 | Hafner | 73/861.37 |

Primary Examiner—Hezron E. Williams
Assistant Examiner—Harshad Patel

[57] ABSTRACT

A Coriolis mass flow meter that measures total mass flow of multi phase fluid mixtures of gases and liquids in any proportion even with slippage occurring among the various phases. The device includes a rotating member made up of a plurality of flow conduits arranged symmetrically around a shaft and driven by an electric motor or internal combustion engine. The conduits are attached on both ends to the shaft with one end closer to the shaft centerline than the other end. The passage of the multiphase fluid from the end of the conduit closer to the shaft and exiting at the end further from the shaft while being rotated causes centrifugal force to be imparted to the fluid separating the gas and liquid inside the conduits into distinct layers. At the same time, Coriolis force is generated as the fluid mixture flows through the conduit with an increasing rotational radius. The Coriolis force is imparted to the conduits where bending beam load cells are attached to measure the force.

11 Claims, 1 Drawing Sheet

MULTIPLE PHASE CORIOLIS MASS METER

BACKGROUND OF INVENTION

1. Field of Invention

The present invention relates to a metering device that measures total combined mass flow of multi phase fluids consisting of mixtures of gases and liquids in any proportion and even when slippage occurs between the gas and liquid or between two liquids. Slippage occurs when gas travels at a different velocity than the liquid in the line or one liquid travels at a different velocity than another liquid. The liquid can be homogeneous or can be a mixture of two or more miscible or immiscible liquids such as oil and water.

2. Background Information

In order to provide background information so that the invention can be completely appreciated in its proper context reference may be made to a number of prior art patents as follows: U.S. Pat. No. 5,301,557 assigned to Micromotion Inc., U.S. Pat. No. 5,287,754 assigned to Khrone Inc., U.S. Pat. No. 4,934,195 assigned to Foxboro Company.

All of the above mass flow meters utilize the Coriolis effect to measure single phase fluid which may be all liquid or all dense gas but have not been successfully used in measuring multi phase fluids such as a mixture of gas and liquid in the entire gas-liquid mixture range. The Coriolis force is produced when the radius of a mass traveling in angular motion is changed. The change in radius causes a corresponding change in angular acceleration which produces a net force tangent to the direction of rotation of the mass and opposite to the direction of rotation.

Present Coriolis mass flow meters rely on producing the Coriolis effect by vibrating the flow tube elements that is either full of liquid or dense gas at their natural frequency. The twist of the tubes is then translated to mass flow by some instrumentation means. However, when these vibrating tube flow meters are used in two phase (gas/liquid mixtures) measurements, vibration of the mixture of liquid and gas in the tubes causes continuously variable dampening forces which oppose harmonic motion. The oscillatory motion of the tubes causes the liquid part to be tossed back and forth or up and down in the gas space, such action causing a portion of the Coriolis force to be absorbed internally in the fluid instead of being transmitted to the tubes where the effect is measured. Because the liquid only occupies partial volume in the tube, oscillation causes the liquid to be displaced at a different rate than the gas because of different densities. This phenomenon causes gross inaccuracies in measurement which cannot be quantified or predicted. The dampening effect of the gas/liquid mixture cannot be quantified or predicted because the instantaneous gas/liquid ratio in the tubes is continuously varying with the flow. Dampening of the tube vibration caused by multi phase fluids also overloads the tube driver because harmonic motion cannot be established or maintained. This makes the instruments either inoperative or unbalanced and results in gross inaccuracies in measured flows or in no flow indications at all. All of these instruments measure the twist of the tubes and when a multi phase fluid is present, the motion of the tube in one direction will produce a different Coriolis force than the motion in the opposite direction which prevents harmonic motion. When the tubes fail to attain harmonic frequency, more excitation force is required which would overload the tube driver.

Other prior arts are U.S. Pat. No. 2,813,423 and U.S. Pat. No. 3,087,325 both titled Gyroscopic Mass Flowmeter issued Nov. 19, 1957 and Apr. 30, 1963 respectively. These devices are both made of conduit formed into loops and rotated or oscillated. When a multiphase fluid is passed through these loops, the centrifugal force will separate the liquid from the gas. The liquid will then settle at portions of largest rotational diameter and will create a liquid seal that will prevent flow similar to a U manometer. Since the liquid is subjected to centrifugal force, the pressure required to displace the seal will be much higher than when the liquid is not rotated. Therefore, this device can only be used for a single phase fluid such as pure liquid or pure gas.

Another prior art is U.S. Pat. No. 2,877,649 titled Coriolis Mass Flowmeter. This prior art also cannot measure multiphase fluids accurately because of the fluid path. The fluid flows from the principal impeller to the sensing impeller in a direction of decreasing radius of rotation. Such flow when the fluid consists of gas and liquid will be separated into gas and liquid because of centrifugal force, the liquid forming a liquid seal on the outer radius of rotation and the gas forming on the inside radius of rotation resulting in a liquid seal or U trap which would require a build up of pressure to dislodge the liquid seal. Also, because of the clearances between the principal and sensing impellers, some of the fluid can bypass the sensing impeller. The turbulence created by flowing from the principal to the sensing impeller also results in Coriolis force being absorbed by the fluid and render the measurement inaccurate.

One other prior art is U.S. Pat. No. 5,359,900 titled Apparatus for Measuring the Mass Throughput of a Flow of Pourable Material According to the Coriolis Principle. This prior art has a torque measuring device that does not eliminate the force due to friction of the bearings and friction due to turbulence created by the rotating member. These forces would add to the Coriolis force and render the results inaccurate. This prior art refers to pneumatic conveying systems which do not require high pressures and therefore seals are not critical. When handling multiphase fluids such as gas, oil and water from oil wells, high pressures can result in high friction forces on mechanical seals and bearings. Also, the turbulence and fluid friction created by contact of the non-measuring surface of the rotating member with the fluid add to the torque being measured. Since these friction forces cannot be quantified, the measurement will be inaccurate. Also, the vane arrangement of the prior art will introduce turbulence into the fluid since the fluid is not directed to flow into a uniform cross section as embodied in the constant cross section of the conduits of the present invention.

Whatever the merits and features of the above cited references are, none of them achieves or fulfills the purposes of the present invention which is to measure accurately gas-liquid mixtures ranging from 0% liquid (all gas) to 100% liquid (no gas) and all the fractions of liquid and gas in between these ranges. When these prior art devices measure liquid mass flow, the presence of gas especially in the higher fractions in the flow stream makes these instruments highly inaccurate. It is the principal object of the present invention to be able to meter accurately any combination of gas and liquid from 0% liquid (all gas) to 100% liquid (no gas) within its designed mass flow rates and without regard to slippage between the gas and the liquid or between liquids if the liquid is a mixture of different types such as oil and water.

The present invention only measures the Coriolis force and is not affected by friction on mechanical seals and bearings and friction created by contact of the non-measuring outside surface of the rotating member and the fluid.

SUMMARY OF THE INVENTION

In fulfillment and implementation of the previously recited deficiencies, the primary feature of the invention is the use of a different method of producing the Coriolis force and different shape of the flow elements. It is achieved without vibrating the tubes and thereby eliminating the errors caused by the dampening effect of the gas/liquid mixture when oscillated by vibration. The present invention prevents any liquid seal from being formed which would stop flow. The device consists of a plurality of flow conduits arranged symmetrically and attached at both ends to a shaft driven by an electric motor or internal combustion engine. The conduits are shaped such that the surface of revolution traced by the conduits when rotated is a cylinder on the inlet end of the conduits, then a truncated cone and finally another cylinder of larger diameter at the outlet end. The fluid inlet will be at a rotating radius smaller than the outlet. See FIG. 1. The fluid enters the inlet of the rotating flow conduits and as it passes through the flow conduits the radius of rotation increases towards the outlet. The change in radius of rotation as the fluid flows through the flow conduits creates a change in angular acceleration which produces the Coriolis force. The progressively increasing radius of rotation as the fluid flows from inlet to the outlet prevents any liquid seal from being formed that can stop flow. It is not necessary that uniformly entrained small bubbles have to be separated from the liquid since a homogenous mixture of liquid and small entrained bubbles will produce an accurate Coriolis force.

The Coriolis force created is based on Newton's second law of angular motion as expressed by the following formula:

$$F = mR^2 w \qquad \text{(Equation 1)}$$

where:

F-Coriolis force m-mass flow

R-radius of gyration w-rotational speed

Applying this formula to the present invention and using a meter factor which includes the radius of gyration since this is constant, the revised equation becomes:

$$F_1 = Kmw \qquad \text{(Equation 2)}$$

where:

$F_1$-force measured by the load cell

K-meter factor m-mass flow w-rotational speed

The flow conduits will be rotated at a speed sufficient to accomplish the following: a.) produce enough centrifugal forces to separate the liquid and the gas such that both fluids can produce the actual Coriolis forces due to mass flow without dampening; since the fluids are not subjected to oscillatory motion and the liquid is separated from the gas, dampening effect is eliminated, and b.) produce enough Coriolis force so that the effect can be measured Coriolis forces are produced tangent to the direction of rotation as the fluid flows from the inlet to the outlet of the flow conduit which has a progressively larger radius of rotation. As the fluid flows through the conduit, its position changes both in the radial and longitudinal directions. The change in angular acceleration due to changing radius of rotation as the fluid flows through the flow conduit creates a net tangential force on the conduit in the opposite direction of rotation. This force is transmitted to the rotating flow conduits in the tangential direction where it is measured by the bending beam load cells. The summation of all the forces measured by each load cell represents the total mass flow rate of the multiphase fluid.

A high angular speed or large rotational radius is not required to effect separation because there is already a large difference in densities between the gas and liquid due to the fluid being subjected to angular acceleration. The liquid, having a much higher density and therefore subjected to the most centrifugal force, will stay in the outer diameter of the flow conduit and the gas, being lighter, will be on the inner rotational diameter. The magnitude of the Coriolis force is a function of the radius of rotation, which is greatest at the portion of the conduit with the largest radius of rotation, the speed of rotation and the amount of mass flow. The flow meter will be calibrated by flowing a known quantity of fluid through the meter and recording corresponding load cell readings. Calibration factors will be calculated and used as a meter constant. The meter will then be able to measure the total mass flow rate accurately by using the meter constant. The accuracy of the meter can be enhanced by utilizing a higher rotational speed. Increasing the speed increases the Coriolis force which will result in better signal to noise ratios. A variable speed meter can be used so that at low mass flow rate ranges the rotational speed can be increased.

DETAILED DESCRIPTION OF THE INVENTION

Figure 1:
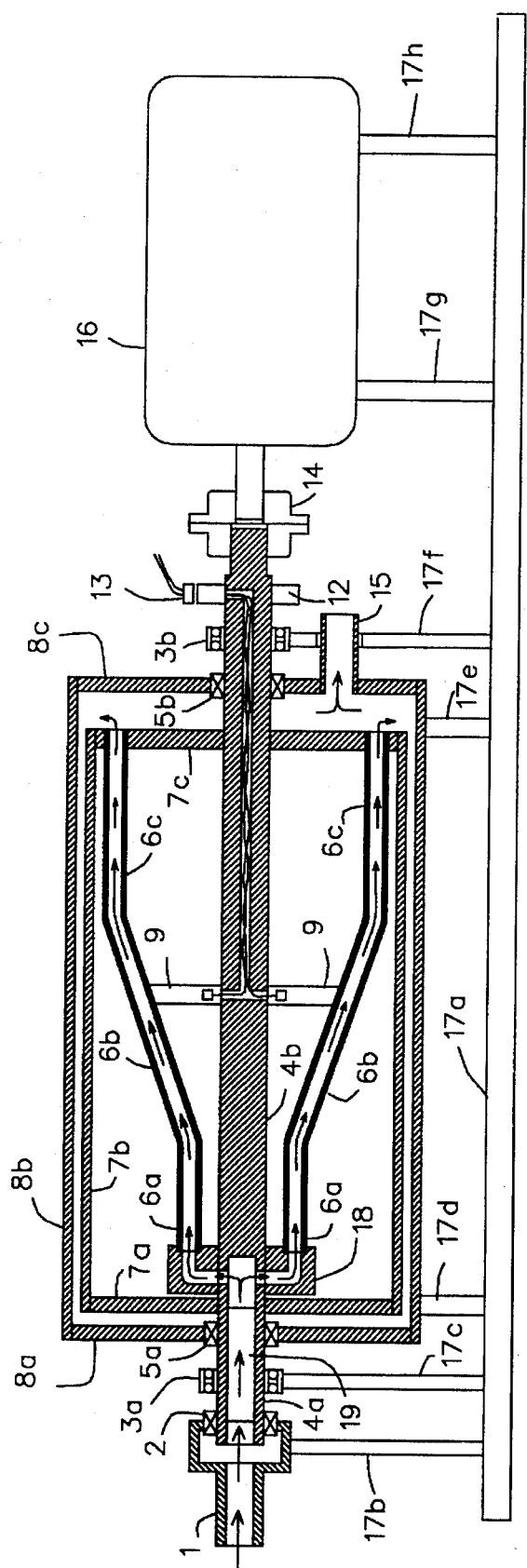
FIG. 1 is a schematic representation of the mass flow meter according to the present invention.

The major feature of the present invention, mass measurement of gas/liquid mixtures, is achieved by rotating the shaped flow conduit or conduits about an axis such that centrifugal and Coriolis forces are produced. The straight portion of the flow conduit immediately after the inlet and being located some radical distance from the axis of rotation produces centrifugal force upon rotation. The centrifugal force separates the liquid towards the outer rotational diameter of the flow conduit wall because of its higher density and the gaseous portion to the inner rotational diameter of the conduit. The separated fluid then flows towards the angled portion of the flow conduit. The increase in radial displacement with respect to the axis of rotation of the gas and liquid as they go through the angled portion of the flow conduit produces the Coriolis force which is a function of mass flow. Since the gas and liquid are already separated, the Coriolis forces contributed by each component of the fluid mixture are undampened and therefore reflects the actual total mass flow of the fluid mixture. This meter can also be used to meter single phase fluids, whether gas or liquid or a combination of different liquids having different densities.

The basic design consists of a stationary line inlet conduit, a coupler to connect the stationary inlet conduit to the rotating shaft, a rotating shaft with a hollow portion which contains a plate partition such that upon passage of the fluid, angular momentum is imparted to the fluid, one or more shaped flow conduits that are rigidly attached to the rotating shaft, an outlet conduit to conduct the fluid away from the meter, a meter enclosure to prevent the fluid from contacting the outer surface of the conduits and load cells, an outer enclosure and frame to enclose the fluid and provide support, seals to prevent the fluid from leaking out of the enclosure, bearings to support the rotating member assembly, a coupling that connects the rotating shaft to the driver, an electric motor or internal combustion engine driver, and a load cell connected to each conduit to measure the Coriolis force.

FIG. 1. shows a schematic drawing of the invention. The fluid mixture enters the meter through the line inlet conduit and coupler 1 which contains the mechanical seal 2. The inlet conduit and coupler 1 connects the stationary inlet to the rotating shaft designated as 4 with sections labeled 4a and 4b. One or more shaped flow conduits designated 6 with sections labeled 6a, 6b and 6c are rigidly attached to the shaft 4 at the inlet conduit plate 18 and the outlet conduit plate 7c which are rigidly attached to the shaft such that centrifugal and Coriolis forces on the flow conduits are produced when the shaft is rotated. From the inlet coupler 1 the fluid enters the hollow section of the rotating shaft 4a which has a plate partition 19 on part of its length to impart further angular momentum to the fluid. The spinning fluid, which would now form an annular flow pattern with the liquid on the outer ring and the gas on the inner ring is split evenly into each of the flow conduits 6.

The split fluid flows into the upstream straight portion of the flow conduit (6a) after passing through the inlet conduit plate 18 where further separation of the gas and liquid due to more centrifugal force occurs since the flow conduit is located farther from the centerline of the rotating shaft. The separated fluid which are now made of gas and liquid layers enters the angled section of the flow conduit 6b where it flows radially and laterally along the angled portion of the flow conduit. As it flows through the angled portion of the conduit, Coriolis force is produced by each component of the fluid because of the change in angular acceleration caused by the radial displacement of the rotated fluid. Since the gas and liquid are already separated, each component would impart Coriolis force to the flow conduit without being dampened or absorbed in the fluid. After the angled portion of the conduits, the fluid enters the downstream straight section of the conduit 6c. The fluid then discharges at the conduit end through the outlet conduit plate 7c and into the meter housing designated 8 and composed of inlet cover plate 8a, cylinder 8b and outlet cover plate 8c. From the meter housing 8 the fluid flows out of the meter through the outlet 15 attached to the outlet cover plate 8c.

The flow conduits are formed such that the rotating radius is increasing in the direction of flow to eliminate a liquid seal which would otherwise form if the flow conduits' downstream ends are bent back towards the shaft. The surface of revolution traced by the rotating conduits from the inlet to the outlet are first a small cylinder, then a surface similar to a truncated cone and finally a larger cylinder. The fluid is discharged at the other end without forming a U-trap or liquid seal on part of the flow conduit that would otherwise create a plug which will stop the flow or will result in a pulsating flow and inaccurate measurement since additional pressure will have to be created upstream of the meter to dislodge the liquid plug and reestablish flow.

As the fluid flows through the part of the conduit 6b oriented at some angle with the shaft, angular and radial momentums are imparted to the fluid which generate Coriolis forces tangent to the direction of rotation and are transmitted to the flow conduit as bending forces counter to the direction of rotation. The force is then transmitted to the bending beam load cell 9. Each load cell is rigidly attached to the shaft 4 and to the flow conduit 6 at a location of maximum force. The force on the load is proportional to the Coriolis force impressed on the flow conduits. The speed of rotation of the meter is also measured since the Coriolis force is also a function of the angular acceleration. The Coriolis force generated in each flow conduit is summed to achieve the total mass flow rate.

Meter factor is calculated by calibrating the meter using a known flow rate and angular velocity and recording the load cell reading at this known flow rate. This meter factor is then calculated using Equation 2. The meter will be maintained at a constant speed of rotation on the measurement range chosen for the meter to eliminate errors caused by angular acceleration or deceleration of the rotating member. The centrifugal force exerted by the fluid on the flow conduits is indicative of the density of the fluid and can be translated directly to the density of the fluid.

The entire meter rests on pedestal support designated 17 and numbered 17a thru 17h. The shaft is supported at two points by bearings 3a and 3b. Bearings are attached to the meter pedestal through mounting plates 17c and 17f. Further down the shaft are two mechanical seals 5a and 5b which prevent the fluid inside the housing 8 from leaking out. Inside the housing 8 is the flow conduit enclosure designated 7 composed of a cylindrical part 7b, a cover plate 7a on one end and the outlet conduit plate 7c at the other end of the enclosure. The flow conduit enclosure prevents contact of the load cells 9 and the outside surfaces of the flow conduits with the process fluid. The plates 7a and 7c are rigidly attached to the shaft 4 and sealed. The cylindrical portion of the enclosure 7b is rigidly attached to the two plates 7a and 7c and sealed. The cylindrical enclosure 7 provides a smoother contact with the fluid instead of the flow conduits churning contact with the fluid if the enclosure 7 were not present. The flow conduits 6 are shaped so that fluid will flow from a small rotating radius to an increasing radius as the fluid flows towards the outlet of the flow conduit. The two sections of the flow conduit parallel to the axis of rotation that are located before and after the angled portion serve two purposes. First, the straight portion before the angled portion serves to impart a larger centrifugal force to the fluid because of the larger radius than the hollow shaft and separate the gas from the liquid further. Second, both the straight sections before and after the angled section of the flow conduit allow more flexibility to the flow conduit which enhance the measurement of Coriolis force.

The rotating section of the meter is attached to the meter drive 16 by means of the shaft coupling 14. The meter drive 16 can be an electric motor or internal combustion engine. The instrument ring 12 transmits the load cell reading to the stationary part 13 through wireless telemetry or by means of brushes.

Those skilled in the art will recognize that other methods of introducing the fluid or measuring the Coriolis force on the flow conduits can be devised but such arrangements would not depart from the essential principles of this invention.

I claim:

1. A multiple phase mass flow meter device consisting of a rotating member that has plurality of flow conduits having inlet and outlet ends rigidly attached to a shaft and symmetrically placed around the shaft such that the rotational diameter of the conduits is progressively increasing from the inlet to the outlet ends, the rotating member being driven by an electric motor or internal combustion engine, the change in rotating radius as the fluid flows through the conduits creating a change in angular acceleration which produces the Coriolis force, such force being tangential to and opposite to the direction of rotation and proportional to the total mass flow rate, the force being imparted to the flow conduits and measured by a bending beam load cell attached to each conduit, the total mass flow being determined by summing the Coriolis force :measured in each flow conduit.

2. A multiple phase mass flow meter according to claim 1 that measures mass flow regardless of whether there is slippage or not between any of the phases of the fluid with respect to the other phases such as between gas and liquid or between liquids.

3. A multiple phase mass flow meter according to claim 1 that measures mass flow rate of the fluid without regard to density within its operating range, such operating range being adjustable by varying the speed of rotation of the meter to obtain the desired range of centrifugal and Coriolis forces.

4. A multiple phase mass flow meter according to claim 1 in which the Coriolis forces impressed on the flow conduits are calculated as a function of the fluid mass flow subjected to change in angular acceleration as a consequence of change in radius of rotation of the fluid as it passes through the section of the flow conduit with increasing radius of rotation with respect to the axis of rotation.

5. A multiple phase mass flow meter according to claim 1 whereby the meter is driven by a variable speed motor or an internal combustion engine with a variable speed control so that the mass flow metering range can be varied.

6. A multiple phase mass flow meter according to claim 1 such that flowing density of the fluid is determined by measuring the force in the radial direction caused by the centrifugal force, such force being a function of the flowing density of the fluid in the flow conduit.

7. A multiple phase mass flow meter for flowable materials comprising of gas and liquid and suspended solids in any proportion of gas and liquid or all gas or all liquid, wherein total mass flow rates are determined based on effect of Coriolis forces, said flow meter consisting of a meter support, a rotating member including a shaft member with hollow inlet end containing a partition plate, the hollow inlet to allow passage of the fluid into a plurality of flow conduits having inlet and outlet ends rigidly attached to plates which are rigidly attached to the shaft member, said conduits being arranged symmetrically around the shaft such that the rotational diameter of the conduits is progressively increasing from the inlet to the outlet ends, a meter inlet conduit and coupler to communicate flow of fluid to the rotating member, a meter outlet to allow flow of fluid out of the meter and a bending beam load cell rigidly attached to each flow conduit at a point in the conduit between the inlet and outlet ends to measure Coriolis force.

8. A multiple phase mass flow meter according to claim 7 whereby a plurality of flow conduits are rotated instead of being vibrated or oscillated, the bulk of the gas phase being separated from the liquid because of centrifugal force impressed on the fluid as the fluid flows through the rotating shaft member and the flow conduits with the resulting phases producing undampened Coriolis forces, such forces being directly transmitted to the flow conduits and measured by the load cells.

9. A multiple phase mass flow meter according to claim 7 in which the surface traced by the path of the rotating flow conduits from the inlet is a cylinder, then a truncated cone and then a larger cylinder at the outlet end of the flow conduits, said flow conduit arrangement preventing a U trap liquid seal from forming that would stop flow until enough pressure builds up to dislodge the liquid plug.

10. A multiple phase mass flow meter according to claim 7 in which the flow conduits when rotated impart a centrifugal force as well as Coriolis three on the multiphase fluid as it flows through the conduits.

11. A multiple phase mass flow meter according to claim 7 whereby the inlet end of the shaft containing the partition plate imparts rotational momentum to the fluid as it flows through the said section of the rotating shaft, thereby subjecting the fluid to initial centrifugal separation as it flows towards the flow conduits, the fluid thereby forming an annular type flow, wherein the liquid would be on the outer diameter and the gas on the inner diameter and thereby distributing the flow evenly to all the flow conduits.

* * * * *